(12) United States Patent
Dierks et al.

(10) Patent No.: US 8,573,915 B2
(45) Date of Patent: Nov. 5, 2013

(54) TRAILER

(75) Inventors: Dale J. Dierks, Mitchell, SD (US);
Michael R. Hanson, Mitchell, SD (US);
Don L. Huber, Alexandria, SD (US);
Ray E. Paradis, Mitchell, SD (US); **A.
Dean Oehlerking**, Mitchell, SD (US);
Cynthia A. Bjerrum, Mitchell, SD (US)

(73) Assignee: Dakota Manufacturing Company, Inc., Mitchell, SD (US)

( * ) Notice: Subject to any disclaimer, the term of this patent is extended or adjusted under 35 U.S.C. 154(b) by 467 days.

(21) Appl. No.: 13/065,845

(22) Filed: Mar. 31, 2011

(65) Prior Publication Data

US 2012/0248736 A1 Oct. 4, 2012

(51) Int. Cl.
*B60P 1/02* (2006.01)
(52) U.S. Cl.
USPC .......................................... 414/480; 414/482
(58) Field of Classification Search
USPC .................. 414/467, 495, 480, 482, 484, 537
See application file for complete search history.

(56) References Cited

U.S. PATENT DOCUMENTS

| | | | | |
|---|---|---|---|---|
| 4,103,793 | A | * | 8/1978 | Weaver .......................... 414/481 |
| 5,326,215 | A | * | 7/1994 | Eberhardt ...................... 414/563 |
| 5,924,754 | A | * | 7/1999 | Kuhns .......................... 296/26.15 |
| 6,315,311 | B1 | * | 11/2001 | Mathiowetz ................. 280/86.5 |

* cited by examiner

*Primary Examiner* — Michael McCullough
(74) *Attorney, Agent, or Firm* — Dennis L. Thomte; Thomte Patent Law Office LLC

(57) ABSTRACT

A trailer for transporting large equipment, buses, recreational vehicles, wherein the trailer includes a main deck at its forward end which is supported upon first and second elongated frame members. First and second running gear beams extend rearwardly from the rearward ends of the first and second frame members with each of the running gear beams including an upwardly and rearwardly extending first beam portion, a rearwardly and horizontally extending second beam portion and a downwardly and rearwardly extending third beam portion. First and second ramps are positioned laterally outwardly of the third beam portions of the first and second running gear beams and are movable between upper and lower positions. Vertically movable bolsters are positioned between the wheels of the axles which support the trailer at the rearward end thereof. The bolsters may be moved from a lower transport position to an upper loading/unloading position.

15 Claims, 11 Drawing Sheets

TRAILER

BACKGROUND OF THE INVENTION

1. Field of the Invention

This invention relates to a trailer and more particularly to a trailer designed to transport large equipment, buses, recreational vehicles, etc. Even more particularly this invention relates to a trailer wherein the trailer includes selectively vertically movable bolsters which are positioned between the wheels of spaced-apart running gear assemblies and also includes spaced-apart ramps at the rearward end of the trailer which may be selectively moved between an upper loading/unloading position and a lower transport position.

2. Description of the Related Art

In assignee's Model No. TE80DG-Bus Trailer, the trailer has fixed bolsters positioned between the wheels of pairs of running gear assemblies. The upper ends of the bolsters dwell in a plane below the upper ends of the wheels of the running gear assemblies. As a bus or the like is loaded onto the trailer from the rearward end thereof, the wheels of the bus move over the rearward-most trailer wheels, then drop down to the upper end of the rear bolsters, then move upwardly over the adjacent wheels and then drop down to the upper end of the forward bolsters. To lower the height of the bus on the trailer during transport, some of the wheels of the bus rest on the bolsters. Further, as the bus is loaded onto the trailer from the rear end thereof, the bus may "high center" on the rearward end of the trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one embodiment of the invention, the trailer includes first and second elongated and longitudinally extending frame members having forward and rearward ends. The trailer also includes horizontally spaced-apart first and second running gear beams having a forward end, a rearward end, an upper end and a lower end. The forward ends of the first and second running gear beams are secured to the rearward ends of the first and second frame members respectively. The forward ends of the first and second running gear beams each have an upwardly and rearwardly extending first beam portion having forward and rearward ends. The upper ends of the first and second running gear beams each have a rearwardly extending second beam portion, having forward and rearward ends, which extend rearwardly from the rearward ends of the first and second beam portions thereof. The upper end of each of the first and second running gear beams have a rearwardly and downwardly extending third beam portion, having forward and rearward ends, which extend rearwardly and downwardly from the rearward end of the second beam portions thereof.

The trailer also includes a front axle having first and second ends with the front axle having wheels secured to the first and second ends thereof. A first suspension system secures the first end of the front axle to the first running gear beam. A second suspension system secures the second end of the front axle to the second running gear beam. A center axle is spaced rearwardly of the front axle and has first and second ends. Wheels are secured to the first and second ends of the center axle. A third suspension system secures the first end of the center axle to the first running gear beam. A fourth suspension system secures the second end of the center axle to the second running gear beam. The trailer also includes a rear axle which is spaced rearwardly of the center axle and has first and second ends. Wheels are secured to the first and second ends of the center axle. A fifth suspension system secures the first end of the rear axle to the first running gear beam. A sixth suspension system secures the second end of the rear axle to the second running gear beam. The wheels on the first ends of the front, center and rear axles are positioned laterally outwardly of the first running gear beam. The wheels on the second ends of the front, center and rear axles are positioned laterally outwardly of the second running gear beam. The upper ends of all the wheels dwell in approximately the same plane as the upper ends of the second beam portions of the running gear beams.

The trailer also includes a frame means, having a forward end, a rearward end, a first side and a second side, which is secured to the rearward ends of the first and second running gear beams. The frame means extends between the first and second running gear beams and also extends laterally outwardly therefrom.

A first deck portion is secured to the first beam portion of the first running gear beam and extends laterally therefrom. A second deck portion is secured to the first beam portion of the second running gear beam and extends laterally therefrom. A first ramp, having forward and rearward ends, is positioned laterally outwardly of the third beam portion of the first running gear beam. The rearward end of the first ramp is pivotally secured to the frame means so as to be selectively movable between an upper loading/unloading position and a lower transport position. The first ramp, when in its upper loading/unloading position, is generally in the same plane as the third beam portion of the first running gear beam. A second ramp, having forward and rearward ends, is positioned laterally outwardly of the third beam portion of the second running gear beam. The rearward end of the second ramp is pivotally secured to the frame means so as to be selectively movable between an upper loading/unloading position and a lower transport position. The second ramp, when in the upper loading/unloading position, is generally in the same plane as the third beam portion of the second running gear beam.

A main deck is positioned on the first and second frame members with the main deck dwelling in a plane which is lower than the upper ends of the second beam portions of the first and second running gear beams. A hitch structure is secured to the forward ends of the first and second frame members for connection to a prime mover such as a truck or the like.

A first selectively vertically movable bolster, having an upper end, is secured to the first running gear beam between the wheels on the first ends of the front and center axles. The first bolster is selectively vertically movable between an upper position and a lower position. A second selectively vertically movable bolster, having an upper end, is secured to the second running gear beam between the wheels on the second ends of the front and center axles. The upper ends of the first and second bolsters, when the first and second bolsters are in their upper position, are generally in the same horizontal plane as the upper ends of the second beam portions of the first and second running gear beams. A third selectively vertically movable bolster, having an upper end, is secured to the first running gear beam between the wheels on the first ends of the center and rear axles. The third bolster is selectively vertically movable between an upper position and a lower position. A fourth selectively movable bolster, having an upper end, is secured to the second running gear beam between the wheels on the second ends of the center and rear axles. The fourth bolster is selectively vertically movable between an upper position and a lower position. The upper ends of the third and fourth bolsters, when the third and fourth bolsters are in their upper position, are generally in the same horizontal plane as the upper ends of the second beam portions of the first and second running gear beams.

In another embodiment of the invention, the center axle, the wheels thereon, the third and fourth suspension systems, and the third and fourth bolsters are omitted.

It is therefore a principal object of the invention to provide an improved trailer for hauling large pieces of construction equipment or the like, recreational vehicles, and buses.

A further object of the invention is to provide a trailer of the type described which includes selectively vertically movable bolsters positioned between the wheels of the running gear assemblies.

A further object of the invention is to provide a trailer of the type described which includes a ramp structure at the rearward end thereof which is movable between an upper loading/unloading position and a lower transport position.

A further object of the invention is to provide a trailer of the type described which enhances the loading and unloading of large pieces of equipment, buses and recreational vehicles.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The trailer of this invention is referred to generally by the reference numeral 10 and includes a forward end 12, a rearward end 14, a first side 16 and a second side 18. The trailer 10 has a gooseneck hitch structure 20 at the forward end thereof for connection to a prime mover such a truck. The gooseneck hitch structure may be of the detachable type if so desired so that equipment, buses, or recreational vehicles may be loaded onto the trailer from the front end thereof when the gooseneck hitch structure 20 is detached from the trailer. The gooseneck hitch structure 20 may also be of the pivoting type such as seen in the drawings so that the forward end of the main deck of the trailer may be lowered if so desired.

Trailer 10 includes a main frame 22 which will now be described in detail. The main frame 22 includes a pair of longitudinally extending frame members 24 and 24' which are horizontally spaced-apart in conventional fashion. Inasmuch as frame members 24 and 24' are identical, only frame member 24 will be described in detail with "'" indicating identical structure on frame member 24'. Frame member 24 includes a bottom flange 26, an upstanding web 28, and a top flange 30.

A plurality of transversely extending frame members 32 are secured to frame members 24 and 24' and extend therebetween in conventional fashion. A plurality of transversely extending frame members 34 extend outwardly from frame member 24 and a plurality of transversely extending frame members 36 extend outwardly from frame member 24'. Channel member 38 is secured to the outer ends of frame members 34 and channel member 40 is secured to the outer ends of frame members 36. A main deck 42 is positioned on the upper ends of frame members 24, 24', 32, 34 and 36.

The numeral 44 refers to an elongated running gear beam having a forward end 46 and a rearward end 48. The numeral 44' refers to an elongated running gear beam which is identical to running gear beam 44. Inasmuch as running gear beam 44' is identical to running gear beam 44, only running gear beam 44 will be described in detail with "'" indicating identical structure on running gear beam 44'. Running gear beam 44 will be described as including an upper end 50 and a lower end 52. The upper end of running gear beam 44 includes a first beam portion 54 which extends upwardly and rearwardly from the forward end thereof. The upper end of running gear beam 44 also includes a second beam portion 56 which extends generally horizontally rearwardly from the rearward end of beam portion 54. The upper end of running gear beam 44 also includes a third beam portion 58 which extends downwardly and rearwardly from the rearward end of beam portion 56.

Figure 1:
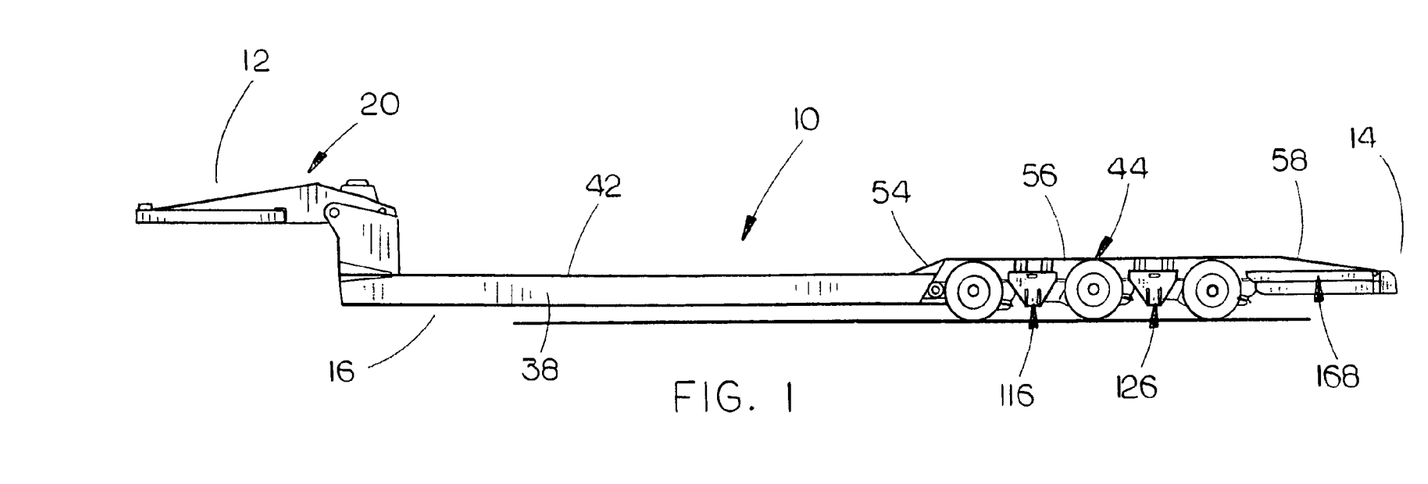
FIG. 1 is a side view of the trailer of this invention with the bolsters thereof in their lowered position and the rear ramps being positioned in their lowered position.
Figure 2:
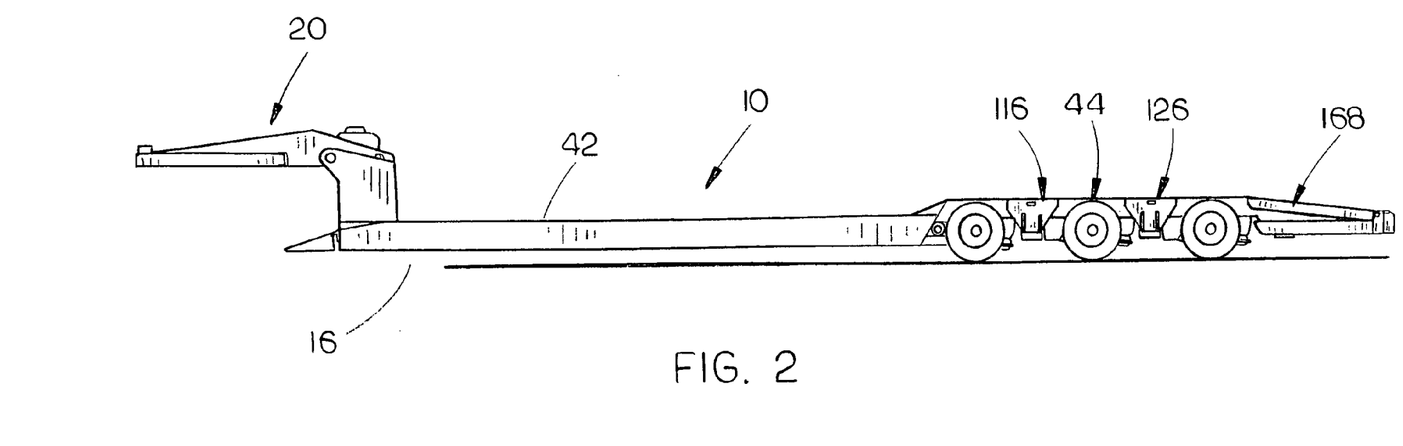
FIG. 2 is a view similar to FIG. 1 except that the bolsters and the rear ramps are in their upper loading/unloading position.
Figure 3:
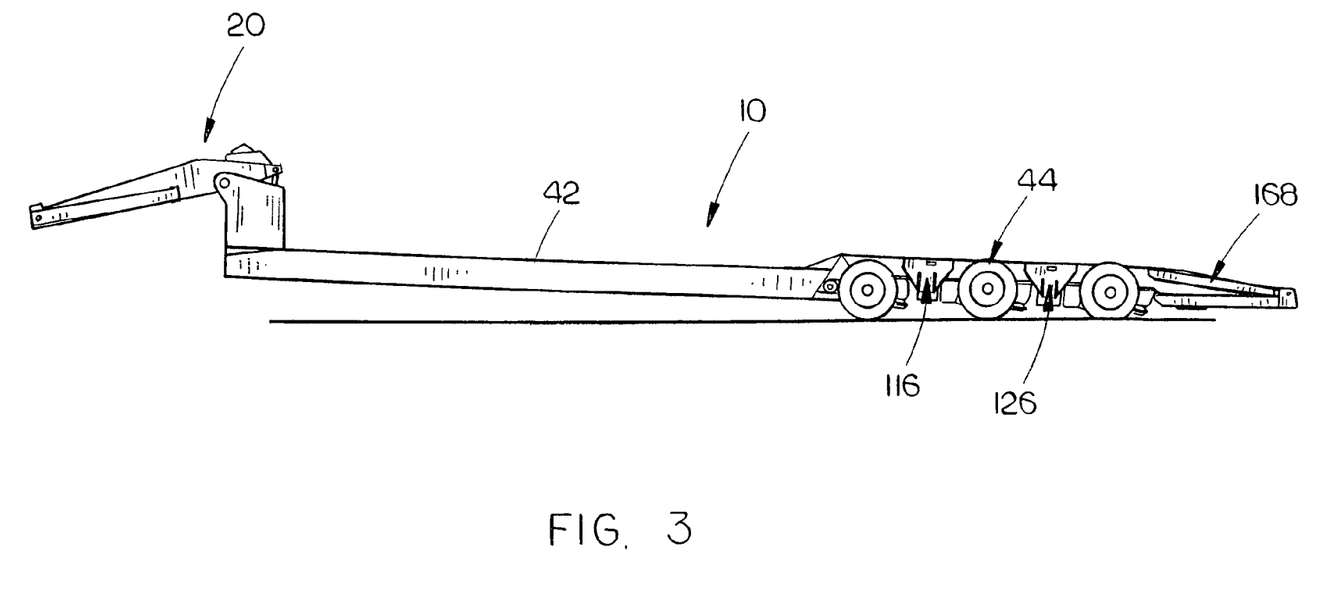
FIG. 3 is a view similar to FIG. 2 except that the gooseneck structure of the forward end of the trailer is shown in its pivoted position.
Figure 4:
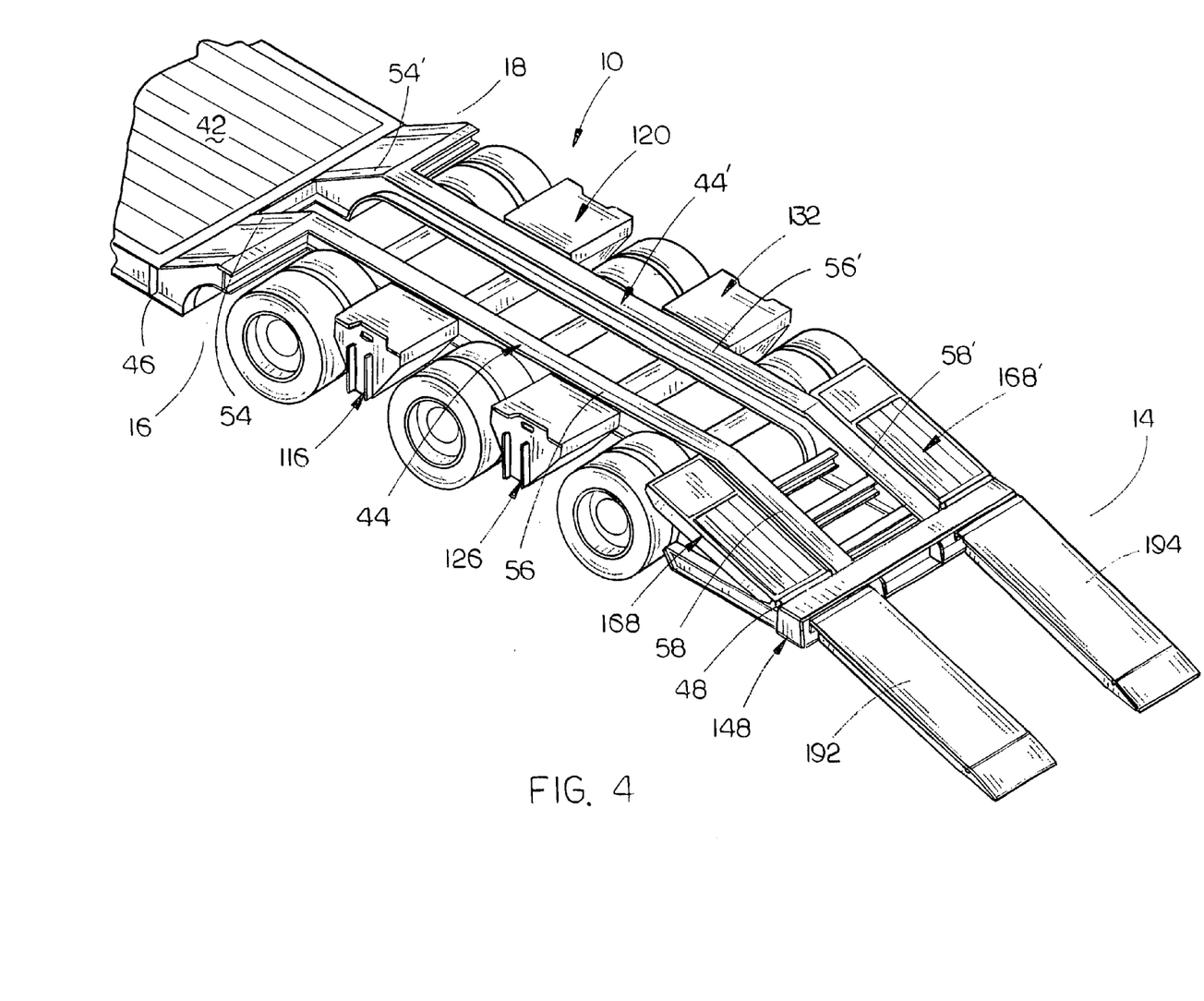
FIG. 4 is a rear perspective view of the rear end of the trailer.
Figure 5:
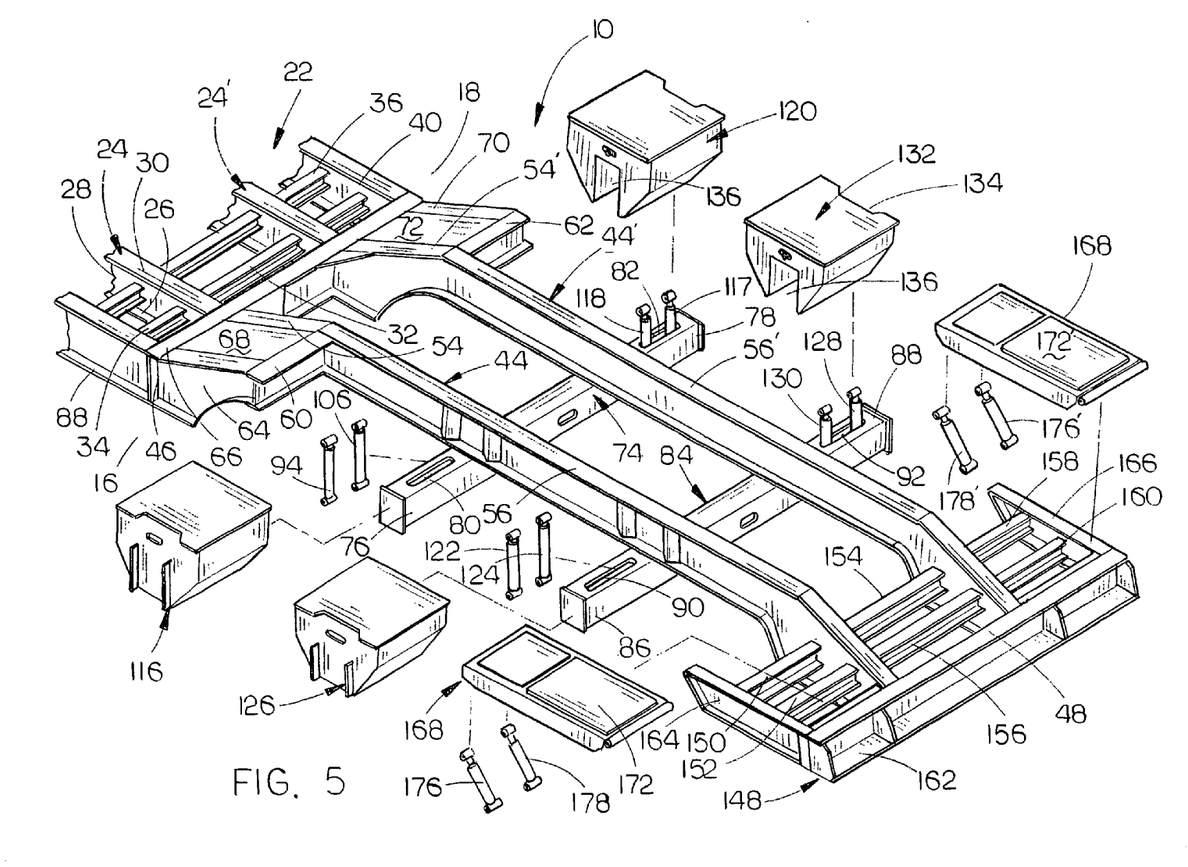
FIG. 5 is an exploded view of the running gears and the associated structure.
Figure 6:
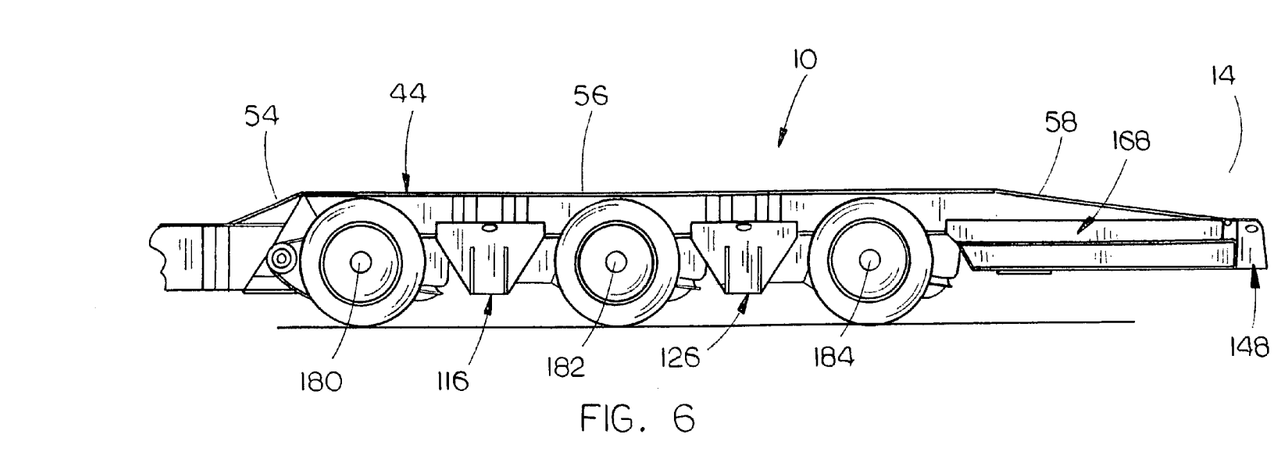
FIG. 6 is a partial side view of the trailer illustrating the bolsters and the rear ramps in their lower position.

Frame member 60 extends horizontally outwardly from running gear beam 44 at the juncture of beam portions 54 and 56 as seen in FIG. 5. Frame member 62 extends horizontally outwardly from running gear beam 44' at the juncture of beam portions 54' and 56' as also seen in FIG. 5. Frame member 64 is secured to the outer end of frame member 60 and extends forwardly therefrom. The forward end of frame member 60 is secured to one end of frame member 66 which is secured to channel member 38, frame member 24, frame member 24' and channel member 40. The forward end of beam portion 54 of running gear beam 44 is also secured to frame member 66. A ramp member 68 is secured to and extends between frame member 64 and beam portion 54. Frame member 70 is secured to the outer end of frame member 62 and extends forwardly therefrom. The forward end of frame member 70 is secured to frame member 66, as seen in FIG. 5. A ramp member 72 is secured to and extends between frame member 70 and beam portion 54'.

A box beam 74, having ends 76 and 78, is secured to running gear beams 44 and 44' with end 76 of beam 74 being positioned outwardly of running gear beam 44 and with end 78 of beam 74 being positioned outwardly of running gear beam 44'. The top wall 79 of beam 74 has slots 80 and 82 formed therein adjacent the ends 76 and 78 respectively.

A box beam 84, having ends 86 and 88, is secured to running gear beams 44 and 44' with end 86 of beam 74 being positioned outwardly of running gear beam 44' and with end 88 of beam 84 being positioned outwardly of running gear beam 44'. The upper wall of beam 84 has slots 90 and 92 formed therein adjacent the ends 86 and 88 respectively.

Hydraulic cylinder 94 has its base end 96 pivotally secured to brackets 98 and 100, which are secured to the upper surface of the bottom wall 102 of beam 74, by pin 104. Hydraulic cylinder 106 has its base end 108 pivotally secured to brackets 110 and 112, which are secured to the upper surface of the bottom wall 102 of beam 74, by pin 113. Hydraulic cylinders 94 and 106 extend upwardly through slot 80 in the top wall 79 of beam 74. The rod ends 114 and 115 of cylinders 94 and 106 respectively are secured to bolster 116 as will be described in more detail hereinafter. The base ends of hydraulic cylinders 117 and 118 are secured to the other end of box beam 74 in the same fashion as hydraulic cylinders 94 and 106. Hydraulic cylinders 117 and 118 extend upwardly through slot 82 in top wall 79 of beam 74. The rod ends of hydraulic cylinders 117 and 118 are secured to bolster 120 in the same manner as the hydraulic cylinders 94 and 106 are secured to bolster 116.

The base ends of hydraulic cylinders 122 and 124 are secured to beam 84 in the same manner as hydraulic cylinders 94 and 106 are secured to beam 74 and extend upwardly through slot 90 in beam 84. The rod ends of hydraulic cylinders 122 and 124 are secured to bolster 126 in the same manner as hydraulic cylinders 94 and 106 are secured to bolster 116. The base ends of hydraulic cylinders 128 and 130 are secured to beam 84 in the same manner as hydraulic cylinders 94 and 106 are secured to beam 74 and extend upwardly through slot 92 in beam 84. The rod ends of cylinders 128 and 130 are secured to bolster 132 in the same manner as the cylinders 94 and 106 are secured to bolster 116.

Inasmuch as bolsters 116, 120, 126 and 132 are identical, only one or more bolsters will be described in detail. As seen, the top wall of each of the bolsters 116, 120, 126 and 132 has a notch 134 formed in the inner end thereof. Each of the inner ends of the bolsters has an opening 136 formed therein which receives the ends of the associated box beam. A plurality of vertically disposed and horizontally spaced plates 138 are positioned within bolster 116 and have an opening 140 formed in the upper ends thereof. The lower ends of the plates have an opening formed therein which receives the associated box beam. Vertically disposed plates P are secured to the outer walls 144 of each of the bolsters. Hydraulic cylinders 94 and 106 extend upwardly into the interior of the bolster 116 between pairs of plates 138 and have the rods ends 114 and 115 thereof respectively aligned with the openings 140. Rod 142 extends through an opening 143 formed in the outer wall 144 of bolster 116 and extends through the openings 140 in the plates 138 and through the rod ends 114 and 115 of cylinders 106 and 94 respectively. An attachment plate 146 is welded to the outer end of rod 142 which is secured to outer wall 144 by screws or the like to maintain rod 142 in its operative position.

A transversely disposed frame means 148 is secured to the rearward ends of running gear beams 44 and 44' as seen in FIG. 5. Frame means 148 includes frame members 150 and 152 which extend outwardly from running gear beam 44. Frame means 148 also includes frame members 154 and 156 which are secured to and extend between running gear beams 44 and 44'. Frame means 148 further includes frame members 158 and 160 which extend outwardly from running gear beam 44'. Frame means 148 additionally includes a transversely extending frame member 162 which is secured to the rearward ends of running gear beams 44 and 44'. Frame member 164 extends forwardly from one end of frame member 162 and is secured to the outer ends of frame members 150 and 152. Frame member 166 extends forwardly from the other end of frame member 162 and is secured to the outer ends of frame members 158 and 160.

Figure 10:
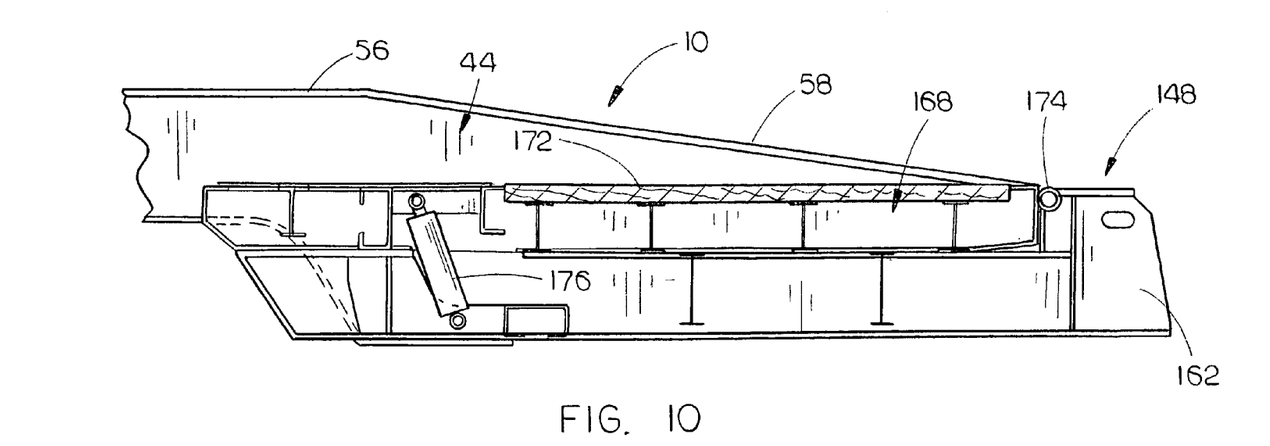
FIG. 10 is a partial sectional view illustrating the ramp assembly at the rear of the trailer being in its lowered transport position.

The numeral 168 refers to a generally rectangular ramp including a support frame 170 having a deck 172 supported thereon. The rearward end of ramp 168 is pivotally secured, about a horizontal axis, to frame member 162 laterally outwardly of frame member 44 at 174. Hydraulic cylinders 176 and 178 have their base ends pivotally secured to frame means 148 and have their rod ends pivotally secured to ramp 168 to enable the ramp 168 to be pivotally moved between the lower transport position of FIG. 10 to the upper loading/unloading position of FIG. 11. A ramp 168' is pivotally secured to the other end of frame means 148 by hydraulic cylinders 176' and 178'. Inasmuch as ramp 168' is identical to ramp 168, only ramp 168 will be described in detail with "'" indicating identical structure on ramp 168'.

Figure 14:
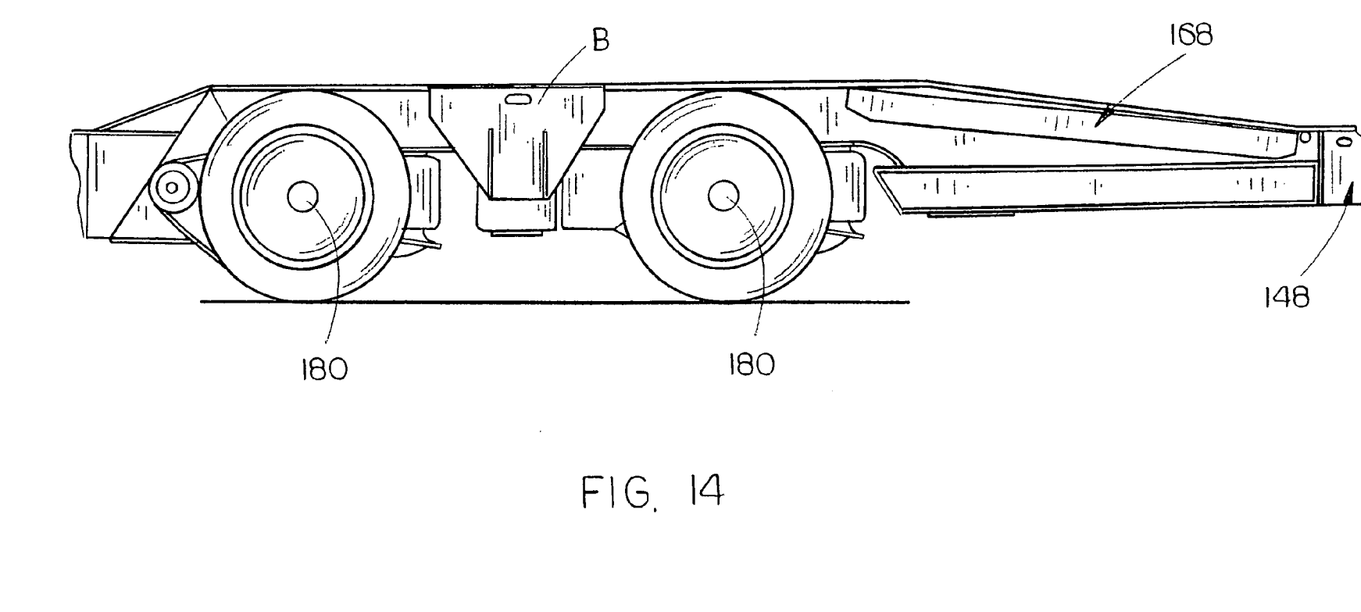
FIG. 14 is a partial side view of a further embodiment of the trailer wherein only two running gear assemblies are positioned on each side of the trailer.

In the embodiment of FIG. 1-13, the trailer 10 has three axles, namely a front axle 180, a center axle 182 and a rear axle 184. Suspension systems 186, 188 and 190 are secured to one end of the axles 180, 182 and 184 respectively. Identical suspension systems are also provided at the other end of the axles 180, 182 and 184. As seen, wheels are mounted on the ends of the axles in conventional fashion. In the embodiment of FIG. 14, only two axles are utilized, namely a front axle 180 and a real axle 184. In that embodiment, only a single bolster B is positioned at each side of the trailer between the front and rear axles.

In both of the embodiments of this invention, the upper ends of the bolsters dwell in approximately the same plane as the upper ends of the second beam portions of the running gear beams when the bolsters are in their upper positions. In both of the embodiments of this invention, the upper ends of the wheels also dwell in approximately the same plane as the upper ends of the second beam portions of the running gear beams and the upper ends of the bolsters.

Figure 7:
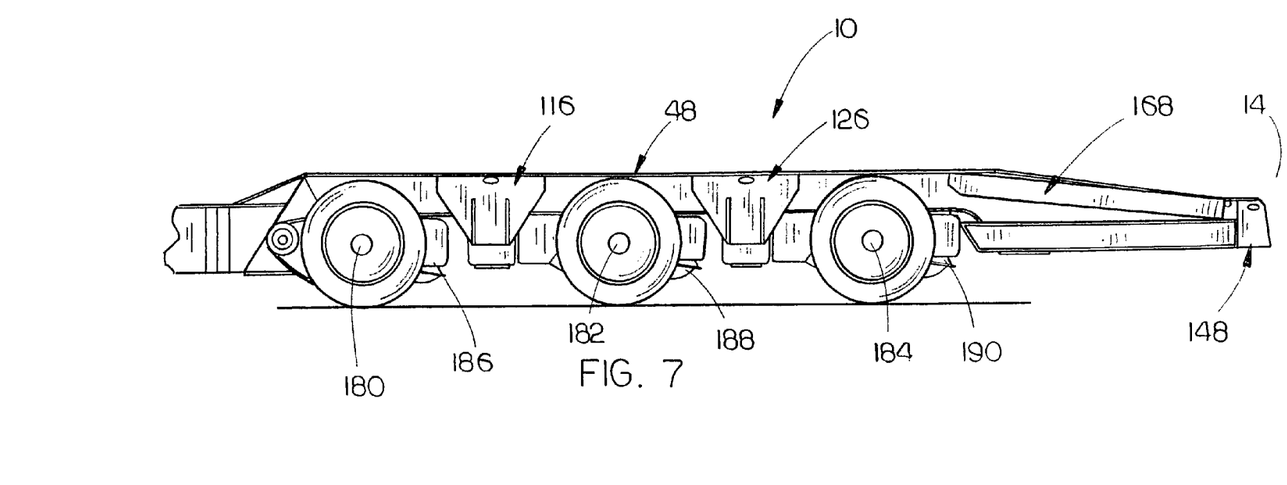
FIG. 7 is a view similar to FIG. 6 except that the bolsters have been moved to their upper position and the ramps have been moved to their upper/loading position.
Figure 8:
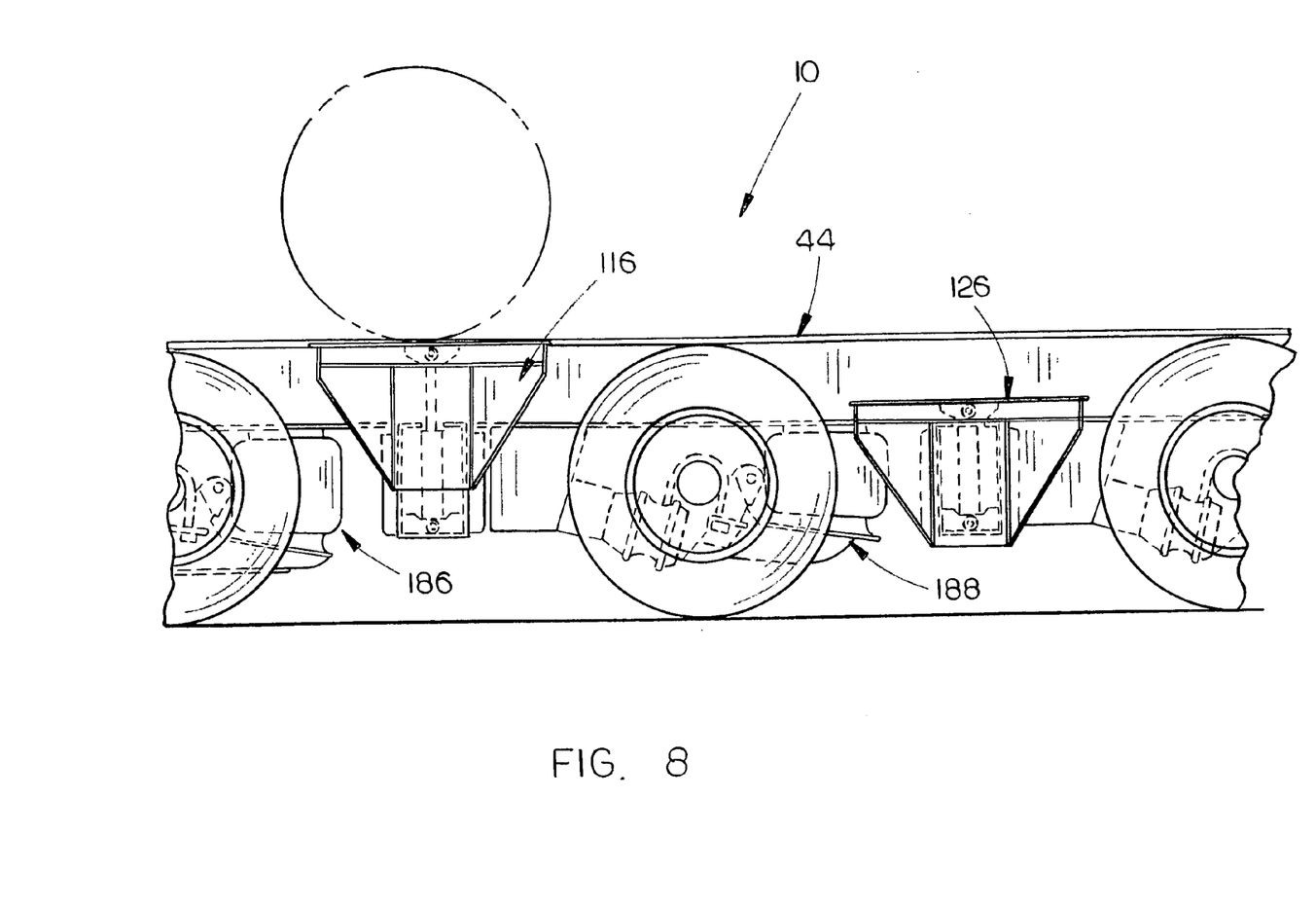
FIG. 8 is a partial side elevational view illustrating one of the bolsters being in its upper position and the other bolster being in its lower position and which illustrates a wheel of a bus or the like being positioned on the bolster which is in its upper position.
Figure 9:
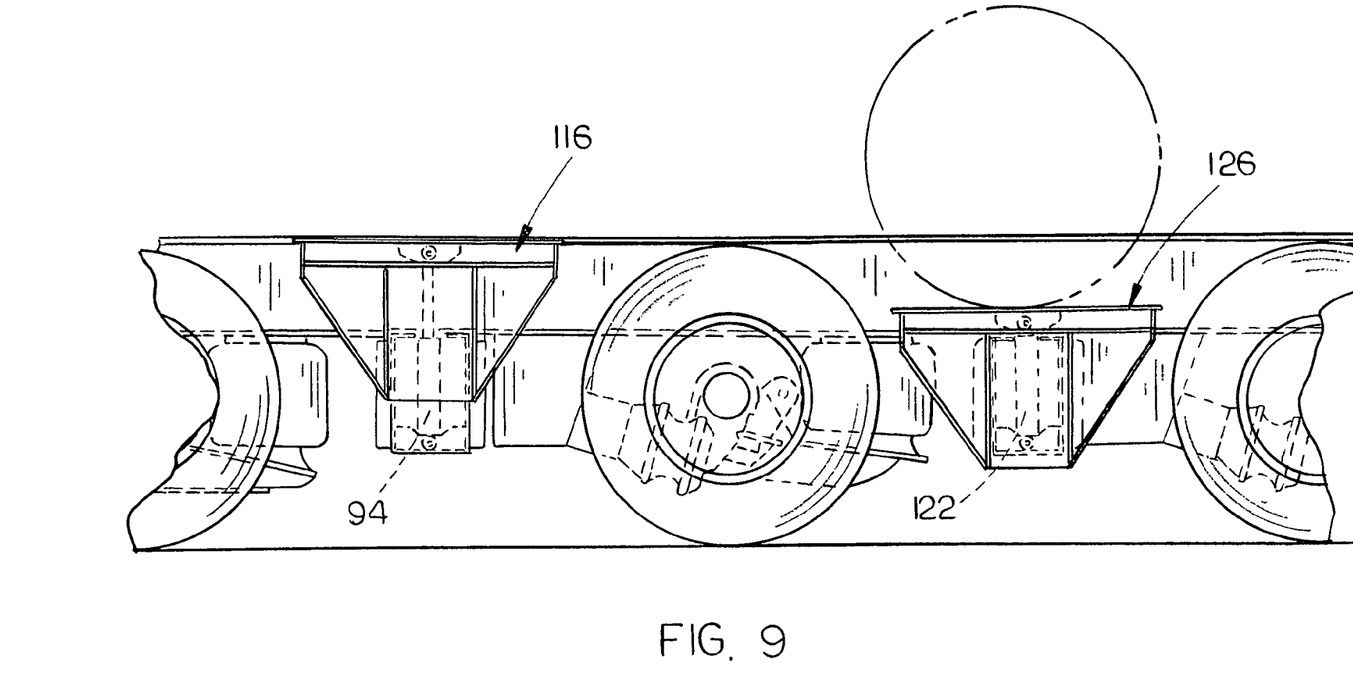
FIG. 9 is a view similar to FIG. 8 except that a wheel of the bus or the like is shown to be resting on the rearward bolster which is in its lower transport position.
Figure 11:
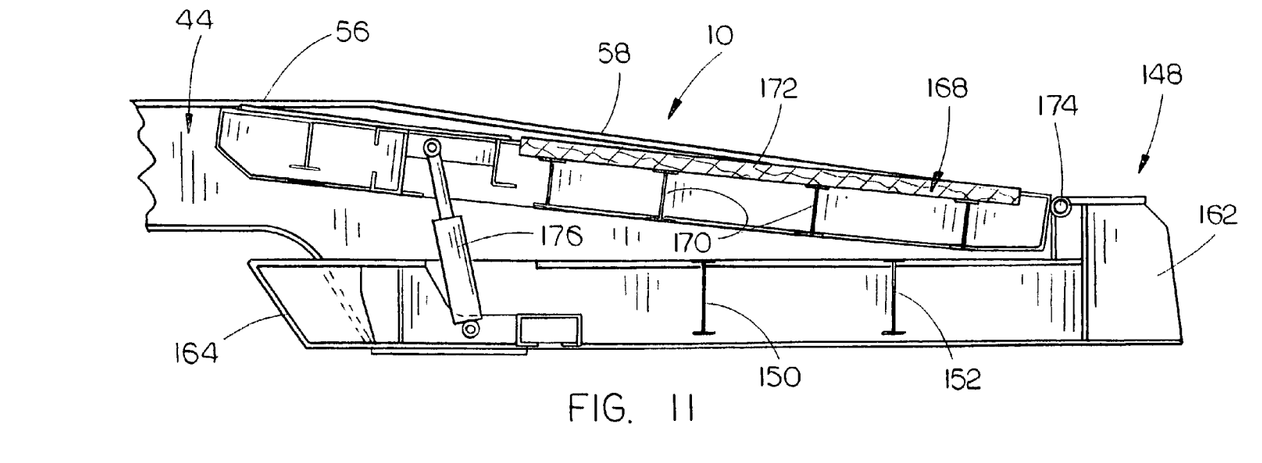
FIG. 11 is a view similar to FIG. 10 except that the ramp structure is shown in its upper loading/unloading position.
Figure 12:
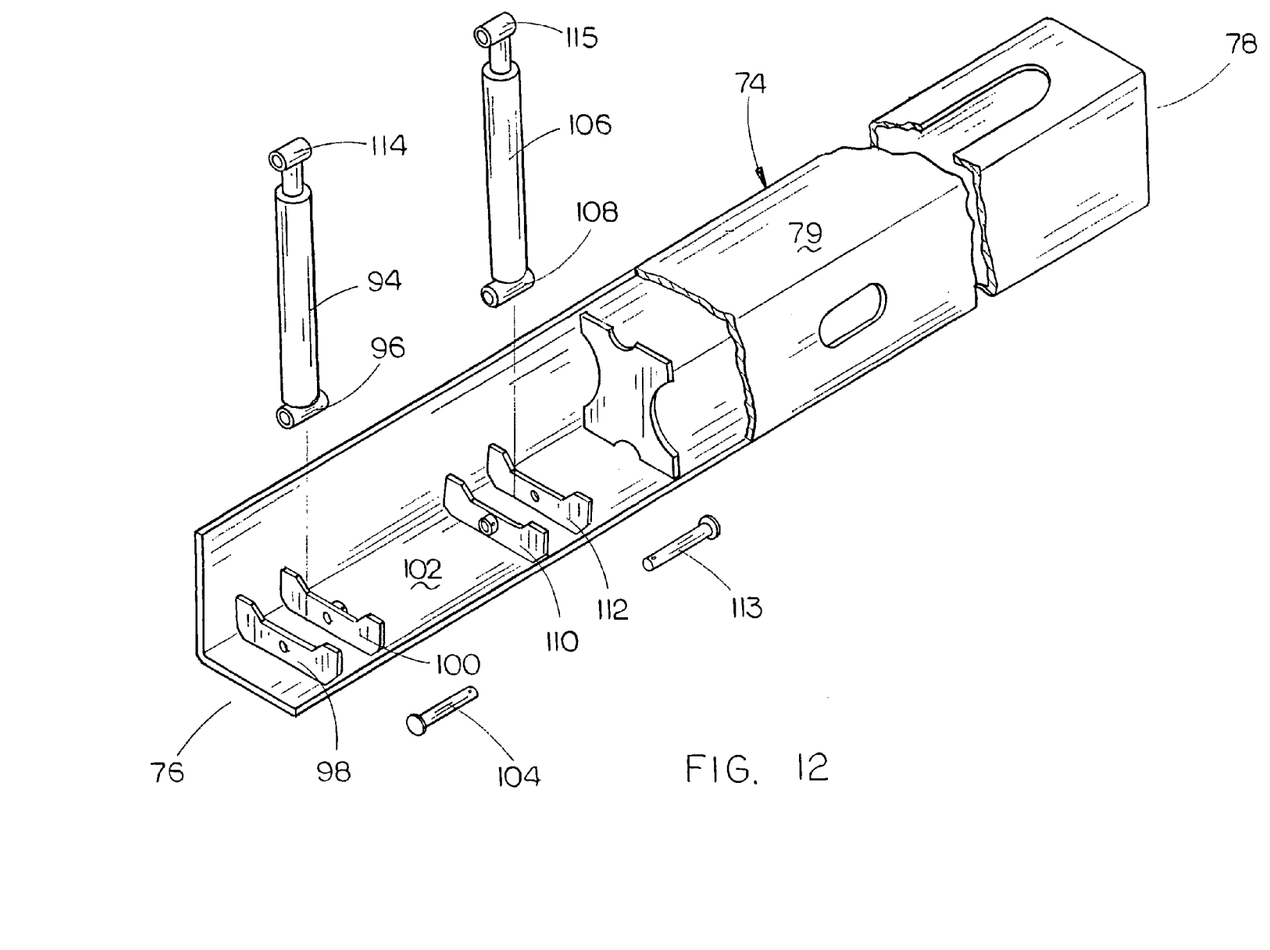
FIG. 12 is a partial perspective view illustrating the hydraulic cylinders which move one of the bolsters between its upper and lower positions.
Figure 13:
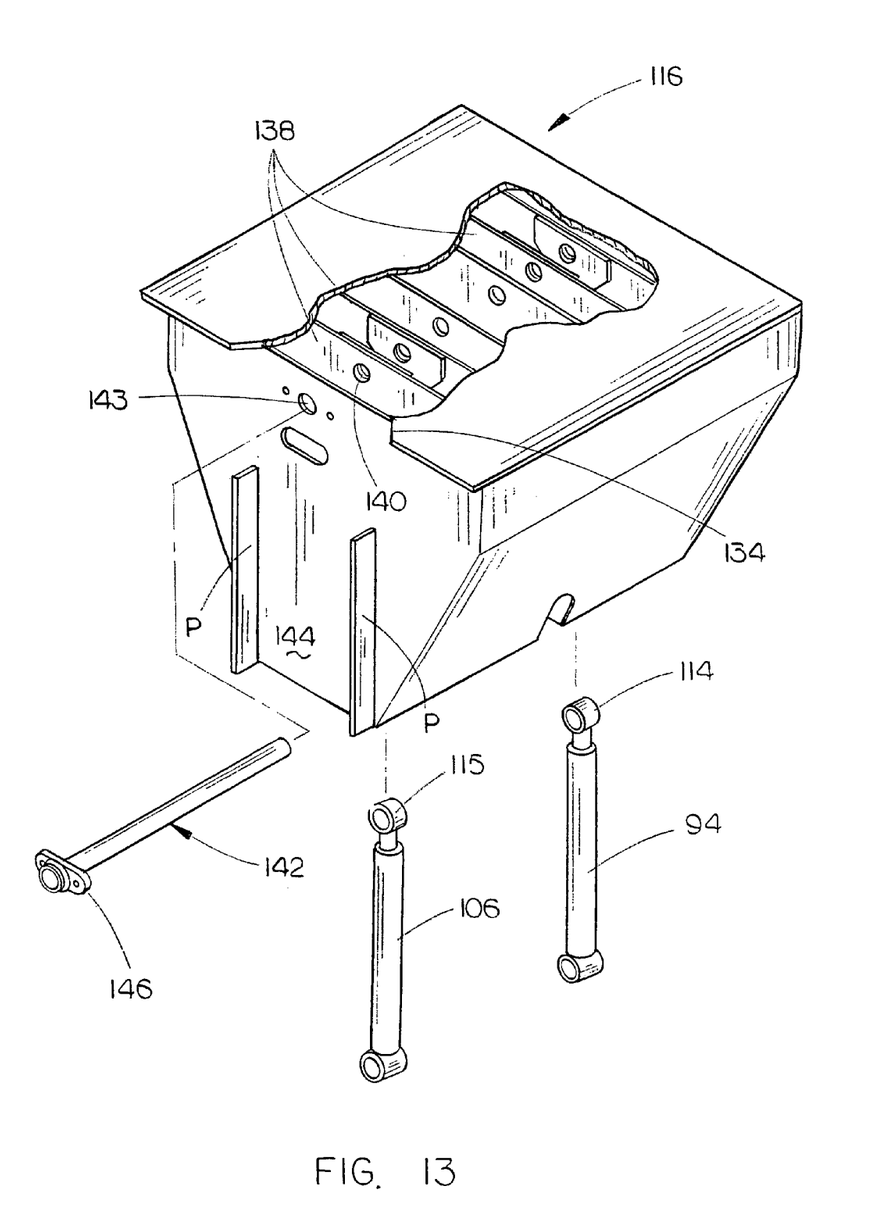
FIG. 13 is a partial perspective view illustrating one of the bolsters.

When the trailer 10 of FIGS. 1-13 is not being used to haul equipment, etc., the ramps 168 and 168' will normally be in their lower transport positions (FIGS. 6 and 10) although they could also be in their upper loading/unloading positions of FIGS. 7 and 11 if so desired. At the time, the bolsters may be in their upper or lower positions.

When it is desired to load a piece of equipment, bus or recreational vehicle onto the trailer, the following procedure is followed. For purposes of description, the procedure will be described as if a bus having front and rear wheels thereon is going to be loaded onto the trailer. If the ramps 168 and 168' are not in their upper loading/unloading position, the hydraulic cylinders 176 and 178 will be extended so that the ramp 168 is pivotally moved from the transport position of FIGS. 6 and 10 to the loading/unloading position of FIGS. 4, 6 and 11. Ramp 168' will be pivotally moved from its transport position to its loading/unloading position by extending the hydraulic cylinders 176' and 178'. In the loading/unloading position, the ramp 168 will dwell in approximately the same plane as beam portion 58 of running gear beam 44 and the ramp 168' will dwell in approximately the same plane as beam portion 58' of running gear beam 44'. A pair of auxiliary ramps 192 and 194 will be detachably secured to frame means 148 so as to be in alignment with ramps 168 and 168' respectively.

The bolsters 116, 120, 126 and 132 will then be moved to their upper position, if not already in their upper position, by extending the hydraulic cylinders associated therewith. For example, the extension of hydraulic cylinders 94 and 106 will cause bolster 116 to be vertically moved upwardly to the upper position.

The bus, not shown, is then either driven forwardly onto the trailer or backed onto the trailer. Assuming that the bus is being driven forwardly onto the trailer 10, the front wheels of the bus will move upwardly on ramps 192, 194, thence onto ramps 168 and 168', thence over the wheels on the ends of the rear axle 186, thence over the bolsters 126, 132, thence over the wheels on the ends of the center axle 182, thence over bolsters 116, 120, thence over the wheels on the ends of the front axle 180, thence downwardly and forwardly over ramps 68, 72 and thence onto the main deck 42 which is lower than the upper ends of the second beam portions 56 and 56' of running gear beams 44 and 44', respectively.

The bus is driven forwardly until the rear wheels of the bus are either positioned on the ramps 168 and 168' or positioned on bolsters 126 and 132 or positioned on bolsters 116 and 120 which will depend upon the length or wheel base of the bus. If the rear wheels of the bus are on ramps 168 and 168', the ramps 168 and 168' will be moved to their lower transport position which lessons the height of the bus. If the rear wheels of the bus are positioned on a pair of the bolsters, those bolsters will be moved to their lower position to lessen the height of the bus.

The ramps 192 and 194 are then stowed and the trailer 10 is ready for transport. The bus may be unloaded by reversing the procedure just described.

Thus is can be seen that the trailer of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:
1. A trailer comprising:
a first elongated and longitudinally extending frame member having a forward end and a rearward end;
a second elongated and longitudinally extending frame member having a forward end and a rearward end;
said first and second frame members being horizontally spaced-apart;
each of said first and second frame members including a bottom flange, an upstanding web, and a top flange;
a first running gear beam having a forward end, a rearward end, an upper end and a lower end;
a second running gear beam having a forward end, a rearward end, an upper end and a lower end;
said forward ends of said first and second running gear beams being secured to said rearward ends of said first and second frame members respectively;
said upper end of said first running gear beam having an upwardly and rearwardly extending first beam portion, having forward and rearward ends, at said forward end of said first running gear beam;
said upper end of said first running gear beam having a rearwardly extending second beam portion, having forward and rearward ends, which extend rearwardly from said rearward end of said first beam portion thereof;
said upper end of said first running gear beam having a rearwardly and downwardly extending third beam portion, having forward and rearward ends, which extends rearwardly and downwardly from said rearward end of said second beam portions thereof;
said upper end of said second running gear beam having an upwardly and rearwardly extending first beam portion, having forward and rearward ends, at said forward end of said second running gear beam;
said upper end of said second running gear beam having a rearwardly extending second beam portion, having forward and rearward ends, which extends rearwardly from said rearward end of said first beam portions thereof;
said upper end of said second running gear beam having a rearwardly and downwardly extending third beam portion, having forward and rearward ends, which extends rearwardly and downwardly from said rearward end of said second beam portions thereof;
a front axle having first and second ends;
wheels secured to said first and second ends of said front axle;
a first suspension system securing said first end of said front axle to said first running gear beam;
a second suspension system securing said second end of said front axle to said second running gear beam;
a center axle spaced rearwardly of said front axle and which has first and second ends;
wheels secured to said first and second ends of said center axle;
a third suspension system securing said first end of said center axle to said first running gear beam;
a fourth suspension system securing said second end of said center axle to said second running gear beam;
a rear axle positioned rearwardly of said center axle;
said rear axle having first and second ends;
wheels secured to said first and second ends of said rear axle;
a fifth suspension system securing said first end of said rear axle to said first running gear beam;
a sixth suspension system securing said second end of said rear axle to said second running gear beam;

said wheels on said first ends of said front axle, said center axle and said rear axle being positioned laterally outwardly of said first running gear beam;
said wheels on said second ends of said front axle, said center axle and said rear axle being positioned laterally outwardly of said second running gear beam;
a frame means, having a forward end, a rearward end, a first side and a second side, secured to said rearward ends of said first and second running gear beams;
said frame means extending between said first and second running gear beams and also extending laterally outwardly therefrom;
a first deck portion secured to said first beam portion of said first running gear beam and which extends laterally therefrom;
a second deck portion secured to said first beam portion of said second running gear beam and which extends laterally therefrom;
a first ramp having forward and rearward ends;
said first ramp being positioned laterally outwardly of said third beam portion of said first running gear beam;
said rearward end of said first ramp being pivotally secured to said frame means so as to be selectively movable between an upper loading/unloading position and a lower transport position;
said first ramp, which is in said upper loading/unloading position, being generally in the same plane as said third beam portion of said first running gear beam;
a second ramp having forward and rearward ends;
said second ramp being positioned laterally outwardly of said third beam portion of said second running gear beam;
said rearward end of said second ramp being pivotally secured to said frame means so as to be selectively movable between an upper loading/unloading position and a lower transport position;
said second ramp, when in said upper loading/unloading position, being generally in the same plane as said third beam portion of said second running gear beam;
a main deck positioned on said first and second frame members;
said main deck dwelling in a position lower than said upper ends of said second beam portions of said first and second running gear beams;
a hitch structure secured to the forward ends of said first and second frame members for connection to a prime mover;
a first selectively vertically movable bolster, having an upper end, secured to said first running gear beam between the wheels on said first ends of said front and center axles;
a second selectively vertically movable bolster, having an upper end, secured to said second running gear beam between the wheels on said second ends of said center and front axles;
a third selectively vertically movable bolster, having an upper end, secured to said first running gear beam between the wheels on said first ends of said rear and center axles;
a fourth selectively vertically movable bolster, having an upper end, secured to said second running gear beam between the wheels on said second ends of said center and rear axles;
said first, second, third and fourth bolsters being selectively vertically movable between an upper position and a lower position;
said upper ends of said first, second, third and fourth bolsters, when said bolsters are in the said upper position, being generally in the same horizontal plane as said upper ends of said second beam portions of said first and second running gear beams.

2. The trailer of claim 1 wherein said hitch structure comprises a goose-neck hitch structure.

3. The trailer of claim 1 wherein at least one hydraulic cylinder is coupled to each of said first, second, third and fourth bolsters for moving said first, second, third and fourth bolsters between said upper and lower positions.

4. The trailer of claim 1 wherein a pair of hydraulic cylinders are coupled to each of said first, second, third and fourth bolsters for moving said first, second, third and fourth bolsters between said upper and lower positions.

5. The trailer of claim 1 wherein at least one hydraulic cylinder is coupled to each of said first and second ramps for moving said first and second ramps between said upper loading/unloading positions and said lower transport position.

6. The trailer of claim 1 wherein a pair of hydraulic cylinders are coupled to each of said first and second ramps for moving said first and second ramps between said upper loading/unloading positions and said lower transport position.

7. A trailer comprising:
a first elongated and longitudinally extending frame member having a forward end and a rearward end;
a second elongated and longitudinally extending frame member having a forward end and a rearward end;
said first and second frame members being horizontally spaced-apart;
each of said first and second frame members including a bottom flange, an upstanding web, and a top flange;
a first running gear beam having a forward end, a rearward end, an upper end and a lower end;
a second running gear beam having a forward end, a rearward end, an upper end and a lower end;
said forward ends of said first and second running gear beams being secured to said rearward ends of said first and second frame members respectively;
said upper end of said first running gear beam having an upwardly and rearwardly extending first beam portion, having forward and rearward ends, at said forward end of said first running gear beam;
said upper end of said first running gear beam having a rearwardly extending second beam portion, having forward and rearward ends, which extend rearwardly from said rearward end of said first beam portion thereof;
said upper end of said first running gear beam having a rearwardly and downwardly extending third beam portion, having forward and rearward ends, which extends rearwardly and downwardly from said rearward end of said second beam portion thereof;
said upper end of said second running gear beam having an upwardly and rearwardly extending first beam portion, having forward and rearward ends, at said forward end of said second running gear beam;
said upper end of said second running gear beam having a rearwardly extending second beam portion, having forward and rearward ends, which extends rearwardly from said rearward end of said first beam portion thereof;
said upper end of said second running gear beam having a rearwardly and downwardly extending third beam portion, having forward and rearward ends, which extends rearwardly and downwardly from said rearward end of said second beam portion thereof;

a front axle having first and second ends;
wheels secured to said first and second ends of said front axle;
a first suspension system securing said first end of said front axle to said first running gear beam;
a second suspension system securing said second end of said front axle to said second running gear beam;
a rear axle spaced rearwardly of said front axle and which has first and second ends;
wheels secured to said first and second ends of said rear axle;
a third suspension system securing said first end of said rear axle to said first running gear beam;
a fourth suspension system securing said second end of said rear axle to said second running gear beam;
said wheels on said first ends of said front and rear axles being positioned laterally outwardly of said first running gear beam;
said wheels on said second ends of said front and rear axles being positioned laterally outwardly of said second running gear beam;
a frame means, having a forward end, a rearward end, a first side and a second side, secured to said rearward ends of said first and second running gear beams;
said frame means extending between said first and second running gear beams and also extending laterally outwardly therefrom;
a first deck portion secured to said first beam portion of said first running gear beam and which extends laterally therefrom;
a second deck portion secured to said first beam portion of said second running gear beam and which extends laterally therefrom;
a first ramp having forward and rearward ends;
said first ramp being positioned laterally outwardly of said third beam portion of said first running gear beam;
said rearward end of said first ramp being pivotally secured to said frame means so as to be selectively movable between an upper loading/unloading position and a lower transport position;
said first ramp, which is in said upper loading/unloading position, being generally in the same plane as said third beam portion of said first running gear beam;
a second ramp having forward and rearward ends;
said second ramp being positioned laterally outwardly of said third beam portion of said second running gear beam;
said rearward end of said second ramp being pivotally secured to said frame means so as to be selectively movable between an upper loading/unloading position and a lower transport position;
said second ramp, when in said upper loading/unloading position, being generally in the same plane as said third beam portion of said second running gear beam;
a main deck positioned on said first and second frame members;
said main deck dwelling in a position lower than said upper ends of said second beam portions of said first and second running gear beams;
a hitch structure secured to the forward ends of said first and second frame members for connection to a prime mover;
a first selectively vertically movable bolster, having an upper end, secured to said first running gear beam between the said wheels on said first ends of said front and rear axles;
said first bolster being selectively vertically movable between an upper position and a lower position;
a second selectively vertically movable bolster, having an upper end, secured to said second running gear beam between the said wheels on said second ends of said front and rear axles;
said upper ends of said first and second bolsters, when said first and second bolsters are in the said upper position, being generally in the same horizontal and second running gear beams.

8. The trailer of claim 7 wherein said hitch structure comprises a goose-neck hitch structure.

9. The trailer of claim 7 wherein at least one hydraulic cylinder is coupled to each of said first and second bolsters for moving said first and second bolsters between said upper and lower positions.

10. The trailer of claim 7 wherein a pair of hydraulic cylinders are coupled to each of said first and second bolsters for moving said first and second bolsters between said upper and lower positions.

11. The trailer of claim 7 wherein at least one hydraulic cylinder is coupled to each of aid first and second ramps for moving said first and second ramps between said upper loading/unloading positions and said lower transport position.

12. The trailer of claim 7 wherein a pair of hydraulic cylinders are coupled to each of said first and second ramps for moving said first and second ramps between said upper loading/unloading position and said lower transport position.

13. A trailer comprising:
a first elongated and longitudinally extending frame member having a forward end and a rearward end;
a second elongated and longitudinally extending frame member having a forward end and a rearward end;
said first and second frame members being horizontally spaced-apart;
a first running gear beam having a forward end, a rearward end, an upper end and a lower end;
a second running gear beam having a forward end, a rearward end, an upper end and a lower end;
said forward ends of said first and second running gear beams being secured to said rearward ends of said first and second frame members respectively;
a front axle having first and second ends;
wheels secured to said first and second ends of said front axle;
a first suspension system securing said first end of said front axle to said first running gear beam;
a second suspension system securing said second end of said front axle to said second running gear beam;
a rear axle spaced rearwardly of said front axle and which has first and second ends;
wheels secured to said first and second ends of said rear axle;
a third suspension system securing said first end of said rear axle to said first running gear beam;
a fourth suspension system securing said second end of said rear axle to said second running gear beam;
said wheels on said first ends of said front and rear axles being positioned laterally outwardly of said first running gear beam;
said wheels on said second ends of said front and rear axles being positioned laterally outwardly of said second running gear beam;
a frame means, having a forward end, a rearward end, a first side and a second side, secured to said rearward ends of said first and second running gear beams;

said frame means extending between said first and second running gear beams and also extending laterally outwardly therefrom;

a main deck positioned on said first and second frame members;

a hitch structure secured to the forward ends of said first and second frame members for connection to a prime mover;

a first selectively vertically movable bolster, having an upper end, secured to said first running gear beam between the said wheels on said first ends of said front and rear axles;

said first bolster being selectively vertically movable between an upper position and a lower position;

a second selectively vertically movable bolster, having an upper end, secured to said second running gear beam between the said wheels on said second ends of said front and rear axles;

said upper ends of said first and second bolsters, when said first and second bolsters are in the said upper position, being generally in the same horizontal plane as the upper portions of said wheels.

14. The trailer of claim 13 wherein a center axle, having first and second ends, is secured to said running gear beams between said front and rear axles and wheels are secured to said first and second ends of said center axle.

15. The trailer of claim 14 wherein vertically movable bolsters are associated with said center axle.

\* \* \* \* \*